United States Patent
Kimata et al.

[11] Patent Number: 5,325,835
[45] Date of Patent: Jul. 5, 1994

[54] ELECTRONIC FUEL INJECTION SYSTEM FOR ENGINE

[75] Inventors: Ryuichi Kimata; Takao Kashima, both of Saitama, Japan

[73] Assignee: Honda Giken Kogyo Kabushiki Kaisha, Tokyo, Japan

[21] Appl. No.: 77,400

[22] Filed: Jun. 17, 1993

[30] Foreign Application Priority Data

Jun. 30, 1992 [JP] Japan .................................. 4-194504

[51] Int. Cl.$^5$ .............................................. F02D 41/34
[52] U.S. Cl. .................................................... 123/475
[58] Field of Search ............ 123/475, 480, 478, 149 D, 123/476

[56] References Cited

U.S. PATENT DOCUMENTS 4,434,770  3/1984  Nishimura et al. ................ 123/478
5,161,496 11/1992  Matsushima et al. ............ 123/185.3

Primary Examiner—Andrew M. Dolinar
Attorney, Agent, or Firm—Pollock, Vande Sande and Priddy

[57] ABSTRACT

An electronic fuel injection system for an engine with a self-triggered ignition system is provided with means for detecting the time interval between two adjacent voltage signals which are induced before and after an ignition signal in a primary winding of the ignition coil, and have a polarity opposite that of the ignition signal. The latest two time intervals which have been detected are compared to each other, and according to the comparison result, one of said two voltage signals is determined as a specific signal for obtaining a fuel injection timing.

6 Claims, 4 Drawing Sheets

ELECTRONIC FUEL INJECTION SYSTEM FOR ENGINE

BACKGROUND OF THE INVENTION

1. Field of the Invention

This invention relates to electronic fuel injection system for engine and, more particularly, to an electronically controlled fuel injection system which can obtain the fuel injection timing without use of any exclusive sensor.

2. Description of the Prior Art

In a well-known electronic fuel injection system, a fuel injection valve is provided in an intake manifold of the engine, and its "on" or "open" time is controlled according to the engine operating conditions to control the fuel injection rate.

In this type of electronic fuel injection system, the fuel ignition timing is an important factor having great influence on the engine performance. Usually, the fuel injection timing is detected by a pulser coil or similar detection means. The pulser coil is so disposed that it faces a magnet provided on the outer periphery of a flywheel connected to a crankshaft, for instance, and the fuel injection timing is obtained according to a magnet detection signal, i.e., a crankshaft rotation detection signal, from the pulser coil. FIG. 6 shows a timing example of the pulser voltage, the shaped waveform obtained therefrom and the fuel injection valve energizing signal.

In a capacitor discharge ignition (CDI) system, the pulser signal for forming the ignition timing is also used for deciding the fuel injection timing.

A self-triggered ignition system, which does not require any pulser signal for fuel injection timing formation, requires an exclusive pulser coil for the fuel injection timing detection. Recently, however, researches and investigations have been conducted concerning fuel injection timing detection systems without any exclusive pulser. As an example, a system has been suggested for obtaining a fuel injection timing signal based on a primary coil voltage waveform in a self-triggered ignition system.

FIG. 7 is a timing chart illustrating this method. It was thought to use the positive or negative part of the voltage induced in the primary coil as a signal source. It has been noted that, however, if it is attempted to obtain a fuel injection timing signal from the negative voltage part used as an energy source for ignition, the energy assigned for the ignition is greatly attenuated. Therefore, it is impossible to obtain a fuel injection timing signal by this method.

Accordingly, studies have been conducted to detect the rising of the positive voltage part of the shaped waveform, and to obtain a fuel ignition timing on the basis of the detected waveform rising. The waveform rising is detected twice in one fuel ignition cycle, and one of the two detections is used as the fuel injection timing. Referring to FIG. 7, a fuel injection valve energizing signal A is produced on the basis of the first appearance of the two waveform risings detected in one cycle, and another fuel injection valve energizing signal B is obtained on the basis of the second waveform rising. In this case, a separate sensor is necessary for judging which one of the fuel injection valve start signals A and B is to be used. In addition, noise is likely to be introduced into the primary coil voltage waveform, making the waveform judgment more difficult.

Recently, there has been an attempt to apply the electronically controlled fuel injection system to small displacement engines such as universal engines and agricultural engines which are not provided with any power source battery, and which are manually started with rope starter or recoil starter systems (Japanese Patent Laid-Open No. 4-43843). In such small displacement engines, the electric power obtainable from a flywheel generator is low during a cranking period, and therefore it is a very important problem to secure a source voltage that is necessary for starting the engine. This means that power for ignition has to be obtained by taking it into consideration to avoid adverse effects on a microcomputer and fuel injection valve drive system.

In the above background, the self-triggered ignition system is desirably used for a small displacement engine, and there is a demand for realizing a practical system for obtaining fuel injection timing according to a signal obtained in the self-triggered ignition system.

SUMMARY OF THE INVENTION

An object of the invention is to provide an electronic fuel injection system for a self-triggered ignition system engine, which permits fuel injection timing to be obtained without provision of any exclusive pulser coil.

The electronic fuel injection system for an engine according to the present invention is provided with means for detecting the time interval between two adjacent two voltage signals which are induced before and after each ignition signal in a primary winding of the ignition coil, and have a polarity opposite that of each ignition signal. The latest two time intervals which have been detected are compared to each other, and according to the comparison result, one of said two voltage signals is determined as a specific signal for obtaining a fuel injection timing.

The operation of the present invention is as follows. In the self-triggered ignition system, a pair of voltage pulses which do not contribute to any ignition are generated before and after each ignition pulse. The interval between the pair of voltage pulses is extremely short compared to the interval between one voltage pulse pair and an adjacent voltage pulse pair. Thus, by detecting and comparing these two continuous intervals, it is possible to readily detect one of the pair voltage pulses not contributing to the ignition as a specific signal for obtaining the fuel injection timing.

DETAILED DESCRIPTION OF THE PREFERRED EMBODIMENT

Figure 4:
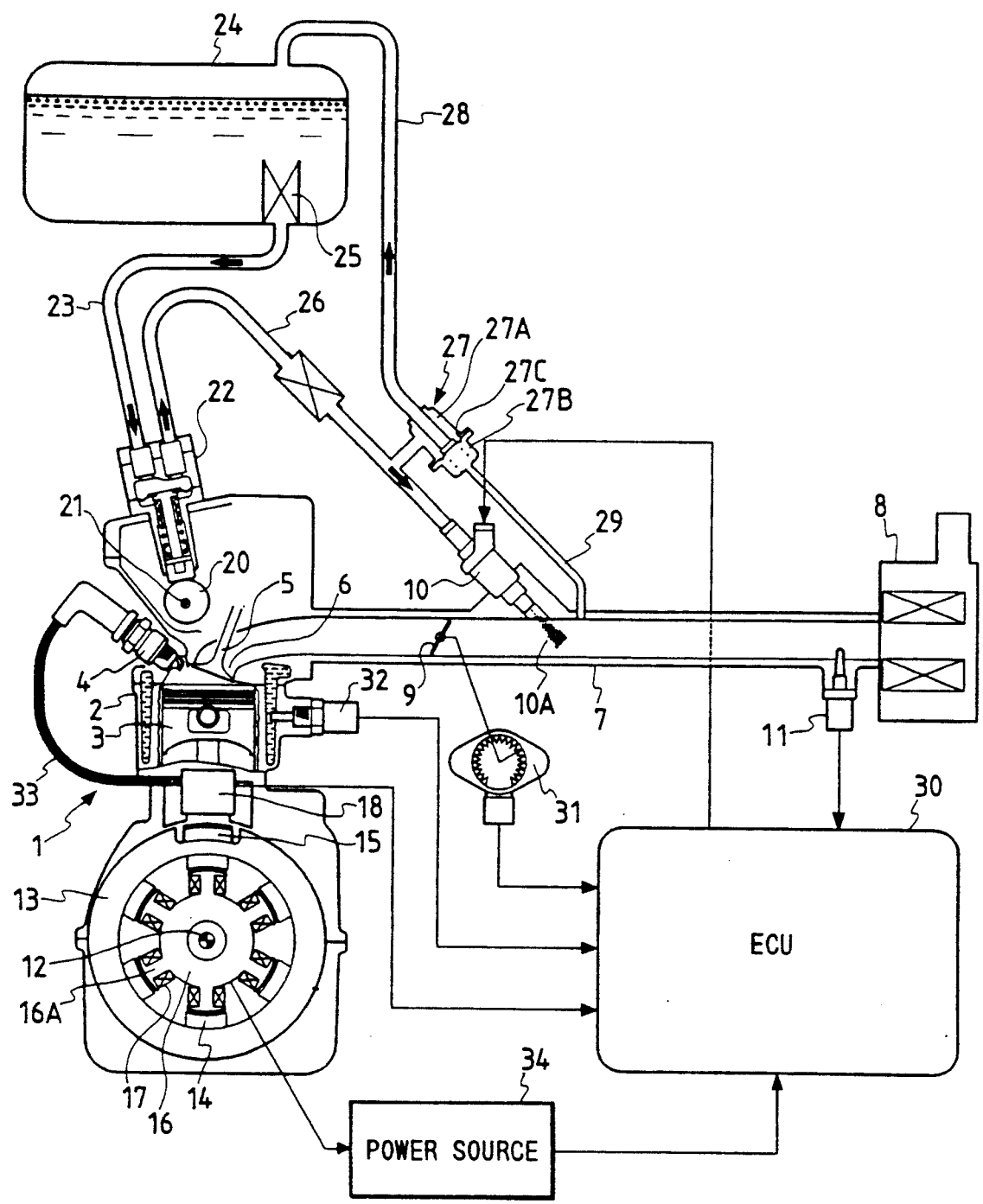
FIG. 4 is a schematic view showing a universal engine for illustrating an embodiment of the present invention.

Now, the present invention will be described in detail with reference to the drawings. FIG. 4 is a schematic view of a universal engine embodiment of the present invention. An engine 1 includes a cylinder 2 having a piston 3 and an ignition plug 4. An intake valve 5 is provided at an intake port 6 open to the top of the cylinder 2. The intake port 6 is communicated with atmosphere via an intake manifold 7 and an air cleaner 8. The intake manifold 7 is provided with a throttle valve 9 and is also provided upstream of the same with a fuel injection valve 10 and a temperature sensor 11 for detecting the intake air temperature. Fuel 10A is injected from the fuel injection valve 10 into the intake manifold 7 upstream of the throttle valve 9.

For manually rotating a crankshaft 12 at the time of the start, a recoil starter (not shown) is mounted on the outer end of a flywheel 13. The flywheel 13 is mounted on the crankshaft 12 of the engine 1. The inner and outer peripheries of the flywheel 13 are each provided with six first magnets 14 and a single second magnet 15. A stator core 16 has six projecting portions 16A, which face the respective first magnets 14, and on which are wound respective coils 17 constituting generator windings. The first magnets 14 and generator windings constitute an injection valve drive power source unit. The coils 17 are connected to a power source circuit 34 for rectifying and stabilizing the generated voltage. The power source circuit 34 supplies the stabilized power source voltage to an ECU 30.

An ignition unit 18 including a pick-up coil and an ignition coil (not shown) is provided such as to face the second magnet 15. A voltage induced in the pick-up coil is applied to the ignition coil. The ignition unit 18 is connected via a lead wire 33 to the ignition plug 4. In this embodiment, the ignition unit 18 is of self-triggering type which will be described in detail with reference to FIG. 5.

Above the cylinder 2 are disposed a fuel pump 22 for pressurizing fuel supplied to the injection valve 10 and a cam 20 for driving the fuel pump 22. The fuel pump 22 has its inlet connected via a duct 23 to a fuel tank 24 and its outlet connected via a duct 26 to the injection valve 10 and also to a pressure regulator 27. The end of the duct 23 opening to the fuel tank 24 is provided with a fuel filter 25. Fuel in the fuel tank 24 is thus supplied through the fuel filter 25 and duct 23 to the fuel pump 22. The fuel pressurized by the pump 22 is supplied to the injection valve 10 through the duct 26.

The pressure regulator 27 has a fuel chamber 27A and a negative pressure chamber 27B, these chambers being partitioned by a diaphragm 27C in a valve body. To the fuel chamber 27A are connected the duct 26 and a duct 28 communicating with the fuel tank 24. To the negative pressure chamber 27B is connected a duct 29 which communicates with the intake manifold 7 in the proximity of the injection port of the injection valve 10. Thus, fuel is partly fed back to the fuel tank 24 by the pressure regulator 27 according to the negative pressure in the neighborhood of the injection port of the injection valve 10, whereby the pressure of the fuel supplied to the injection valve 10 is regulated to be substantially constant.

The engine 1 is provided with a throttle valve opening sensor 31 for detecting the opening degree of the throttle valve 9 and also with an engine temperature sensor 32 for detecting the cooling water temperature of the cylinder 2. Detection signals from these sensors 31 and 32 are supplied to the ECU 30 together with the detection signals from the inspired air temperature sensor 11 and a TDC sensor. The ECU 30 calculates the "open" timing and "open" time (duration) of the injection valve 10 and outputs an injection valve drive signal to open the injection valve 10, thus causing injection of fuel 10A into the intake manifold 7.

Now, the operation of the engine will be described. When the flywheel 13 secured to the crankshaft 12 is rotated by manually operating the recoil starter (not shown), the cam 20 is rotated to drive the fuel pump 22, thus pressurizing fuel. The rotation of the flywheel 13 also causes voltage generation on the generator coils 17 to supply power via the power source circuit 34 to the ECU 30, and concurrently causes an ignition plug drive voltage on the ignition coil in the ignition unit 18, whereby voltage is applied to the ignition plug 4.

Since in the engine 1 the first magnets 14 and coils 17 which generate electric power for driving the injection valve and the second magnet 15 and ignition unit 18 which generate electric power for driving the ignition plug are provided independently, a large source voltage swing or drop in the ignition unit due to every ignition operation does not substantially directly affect the source voltage for driving the injection valve. Thus, there is no mutual interference of the operations of ignition and of fuel injection with each other, and the injection valve 10 and ignition plug 4 can be operated efficiently even with comparatively low power energy based on the inertial rotational energy of the flywheel 13 in the course of cranking of the battery-less engine.

Figure 5A:
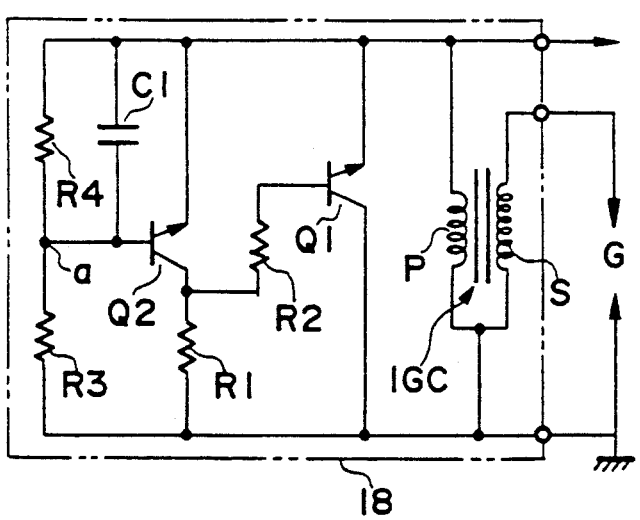
FIGS. 5A and 5B are, respectively, a circuit diagram showing an example of a self-triggered ignition system and a time chart showing an output signal.

Now, the construction of the ignition unit 18 will be described with reference to the circuit diagram of FIG. 5A. An ignition coil IGC is so disposed that it faces the second magnet 15 shown in FIG. 4. A main transistor Q1 is connected in series with the primary winding P of the ignition coil IGC, and a control transistor Q2 is connected to the main transistor Q1. The emitter-collector path of the control transistor Q2 is connected in series with a resistor R1, and the series circuit is connected in parallel with the emitter-collector path of the main transistor Q1. The base of the main transistor Q1 and the collector of the control transistor Q2 are connected to each other via a resistor R2. The base potential on the control transistor Q2 is varied according to the potential on a connection node of voltage division resistors R3 and R4, the series circuit thereof being connected in parallel with the primary winding P of the ignition coil IGC. A base voltage stabilization capacitor C1 is connected in parallel with the resistor R4.

Figure 5B:
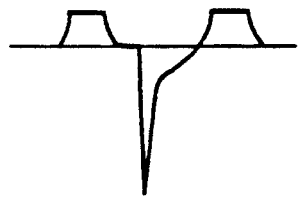
Figure 6:
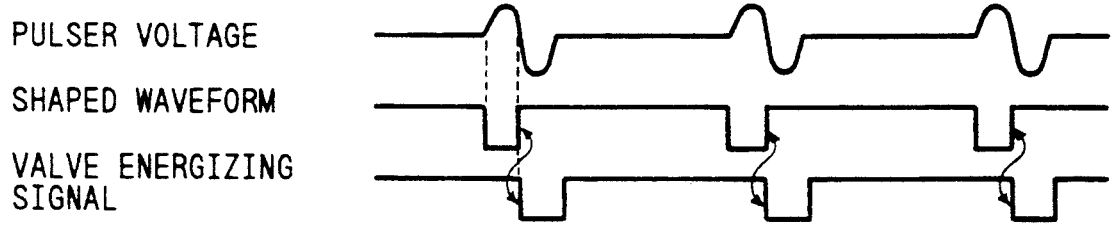
FIG. 6 is a timing chart illustrating the operation of a prior art system.
Figure 7:
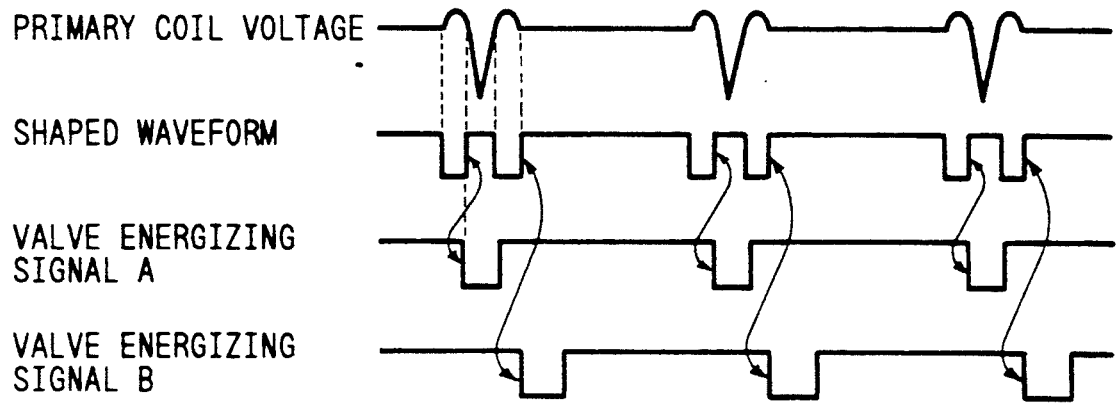
FIG. 7 is a timing chart illustrating the operation of a different prior art system.

In operation, a movement of the second magnet 15 along the ignition coil IGC induces a voltage across the primary winding P of the ignition coil IGC, thus making the potential on the collector of the main transistor Q1 to be positive. As a result, a base current is caused to pass through the resistors R1 and R2 to turn on the main transistor Q1, thus causing a low voltage current flow through the primary winding P of the ignition coil IGC. When the voltage across the emitter-collector of the main transistor Q1 is subsequently increased and the potential on the node reaches the trigger potential of the control transistor Q2, the control transistor Q2 is turned on. Then, the main transistor Q1 is turned off to cut the current in the primary winding P of the ignition coil IGC in a moment, thus causing electromagnetic induction of a high voltage across the secondary winding S of the ignition coil IGC. A spark is thus generated in an ignition plug G. FIG. 5B shows the waveform of the voltage induced across the primary winding P of the ignition coil IGC at this time.

Now, control for fuel injection timing determination in the present embodiment will be described with reference to the timing chart of FIG. 2. Referring to the Figure, a waveform S1 is a voltage induced across the primary winding P of the ignition coil IGC, and a waveform S2 is obtained by rectifying the waveform S1 such as to be able to obtain only positive voltage as a signal, and by inverting the polarity thereof. A waveform S3 is a fuel injection valve energizing signal which is generated in response to the rising of the first one of a pair of voltage pulses respectively detected before and after each ignition signal (i.e., each negative voltage pulse in the waveform S1).

Figure 2:
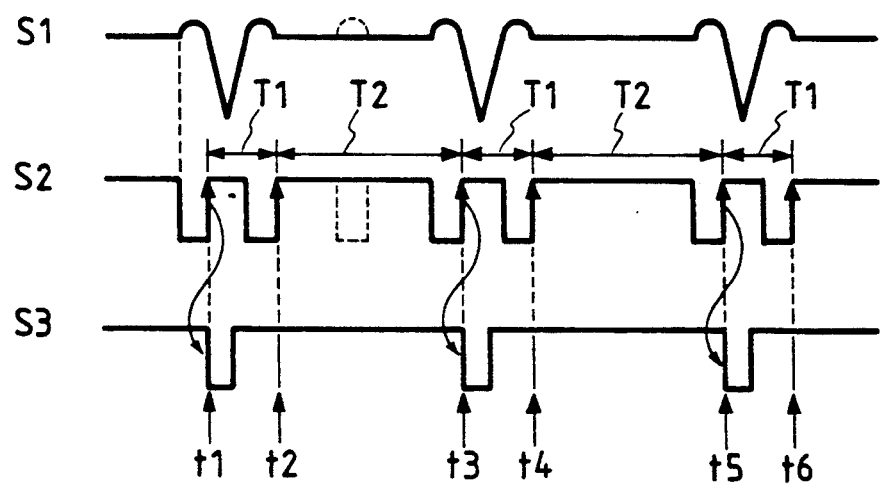
FIG. 2 is a timing chart showing an example of fuel injection timing in an embodiment according to the present invention.

In the example shown in FIG. 2, the rising of the first one of the paired positive voltage pulses is used as a specific signal for obtaining the fuel injection timing. Judgement as to which one of the paired positive voltage pulses detected with each ignition pulse is to be responded to output the fuel injection valve energizing signal, is done as follows. The interval between the pair of positive voltage pulses is denoted by T1, and the interval between a particular positive voltage pulse pair and an adjacent positive voltage pulse pair is denoted by T2. Whenever the rising of the waveform S2 is detected, the latest two intervals T1 and T2 are compared as to their length, and judgment as to whether the last detected rising is to be made the specific signal for fuel injection, is made on the basis of a predetermined criterion of comparison.

For example, when the rising of the waveform S2 is detected, the latest two preceding continuous intervals are compared to each other. If the latest one of the two compared intervals is longer than the second latest one, the latest detected rising is set as a reference instant for the fuel injection timing determination. On the basis of this judgment criterion, instants t1, t3 and t5 are judged to be the fuel injection timings, and the fuel injection valve start signal is output at these timings. With an inverse judgment criterion, in which the rising instant is judged to be the fuel injection timing when the latest one of the two compared intervals is shorter than the second latest one, instants t2, t4 and t6 are judged to be the fuel injection timings.

The actual timing of outputting the fuel injection valve energizing signal, i.e., the fuel injection timing, that is determined on the basis of the result of detection of each timing, may be adjusted to be optimum for engine operation by adding a predetermined time delay.

In the event of introduction of noise into the primary coil voltage waveform S1 as shown by the dashed line in FIG. 2 depending on the timing of the noise introduction, there is a possibility of an erroneous operation being generated in one detection cycle to cause disturbance of the fuel injection timing. However, since two successive time intervals are compared to determine the specific signal for obtaining the fuel injection timing, the normal operation can be automatically restored at least from the next cycle of detection.

Figure 3:
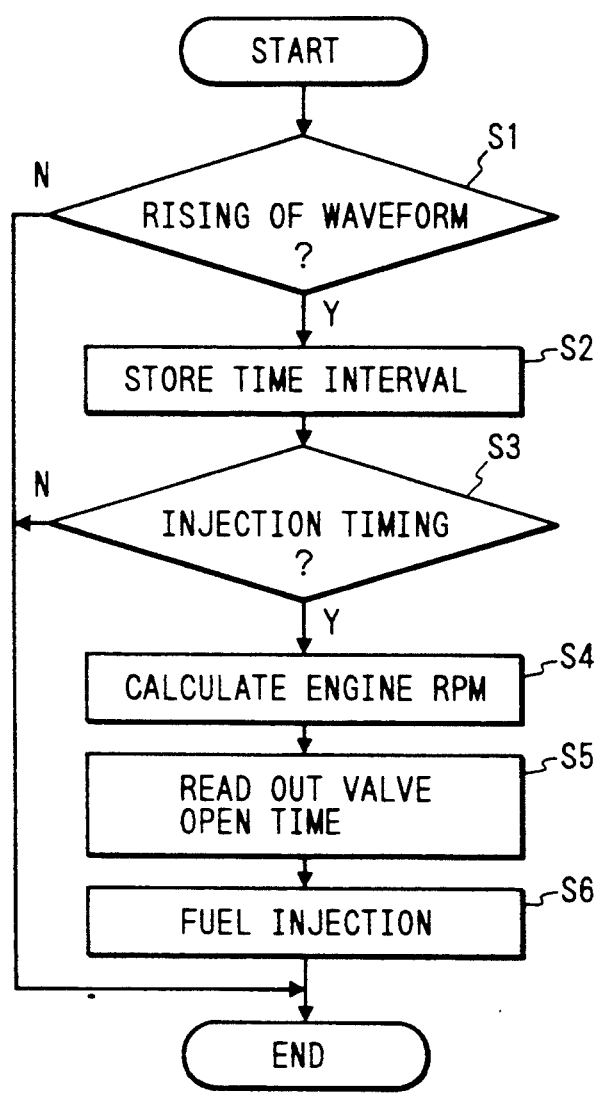
FIG. 3 is a flow chart illustrating a fuel injection sequence according to the present invention.

The operation of fuel injection will now be described with reference to the flow chart of FIG. 3. In a step S1, a check is done as to whether the rising of the shaped waveform (waveform S2) of the voltage generated across the primary winding P of the ignition coil IGC is detected, in other words, it is judged whether or not the interval comparison timing is in force.

If the rising of the waveform S1 is detected, a step S2 is executed, in which the elapsed time (interval) from the rising of the waveform S1 detected in the previous detection is measured and stored in a predetermined register. As the register, may be used a shift register to be able to store the latest two pieces of data continuously and successively detected. In a step S3, the two pieces of data stored in the register are compared with each other, and it is judged whether or not the fuel injection timing prevails according to the predetermined comparison criterion. If it is judged that the fuel injection timing prevails, a step S4 is executed, in which the engine rpm is calculated. In the calculation, first the two latest pieces of data (i.e., time interval data) are added together to determine the engine rotation cycle, and the rpm is calculated therefrom.

In a step S5, the valve opening time is read out of a predetermined map memory according to the calculated rpm. In a step S6, fuel is injected for the value "open" time noted above. It is possible, as mentioned above, to adjust the actual fuel injection timing by providing an adequate delay time in the operation of at least step S6.

Figure 1:
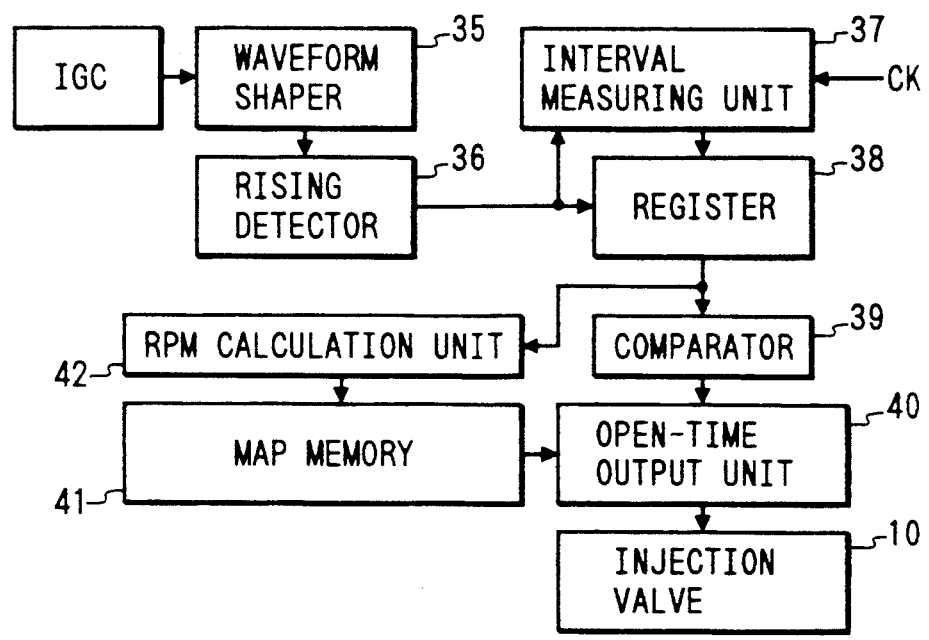
FIG. 1 is a block diagram showing essential functions according to the present invention.

Now, the functions corresponding to the operations shown in the flow chart of FIG. 3 will be described with reference to the block diagram of FIG. 1. A waveform shaping unit 35 shapes the waveform of the voltage supplied from the primary side of the ignition coil IGC and supplies the shaped voltage signal to a rising detector 36. When the rising detector 36 detects the rising of the supplied voltage signal, it outputs a detection signal to an interval measuring unit 37. The interval measuring module 37 counts clock pulses CK, and in response to the rising detection signal it supplies a count value signal of the clock CK to a register 38. The register 38 is preferably constructed to be able to store the newest two pieces of count value signals that is interval data. The interval measuring unit 37 is desirably so constructed that its count is cleared for simplifying the calculation just after the count is output to the register 38.

In response to the detection signal output from the rising detector 36, the register 38 supplies to a comparator 39, the present count value which is just input from the interval detector 37 and the immediately preceding count value which has been input to and stored in it. The comparator 39 compares the two supplied count values. As a result of the comparison a fuel injection timing is detected on the basis of a predetermined criterion, whereupon the comparator 39 causes a valve "open" time output unit 40 to be started to open the fuel injection valve 10. The valve "open" time is determined according to fuel injection time data read out of a map memory 41. In the map memory 41, fuel injection time data are preliminarily stored as a function of the engine rpm, and read out in response to a rpm value calculated in a rpm calculation unit 42 on the basis of the two pieces of interval data stored in the register 38. The fuel injection time data stored in the map memory 41 may not be the engine rpm function noted above, but it may instead be a function of other elements indicative of the engine operating condition, such as the throttle valve opening angle, engine temperature, inspired air amount, etc.

As has been described in the foregoing, according to the present invention, the fuel injection timing can be obtained according to a voltage signal induced on the ignition coil primary side, that is, the invention obtains the fuel ignition timing by effectively utilizing a voltage waveform signal which does not contribute to the ignition in the self-triggered ignition system. Thus, there is no need of providing any exclusive sensor for the fuel injection timing determination, thus simplifying the system construction. In addition, in the event of noise introduction into the voltage waveform signal line, fuel injection timing deviation is caused only temporarily, and the normal fuel injection timing can be promptly and automatically restored. This means that it is possible to provide a system which is stable irrespective of noise. Thus, according to the present invention, it is possible to assemble an electronically controlled fuel injection system in the operating system for a comparatively small displacement and battery-less engine in which start power obtainable from a flywheel generator is low and there is difficulty in obtaining a voltage necessary for the start of engine, while keeping the advantageous characteristics of the self-triggered ignition system.

What is claimed is:

1. An electronic fuel injection system for an engine comprising a self-triggered ignition unit for generating ignition signals induced on the primary side of an ignition coil in synchronism to the rotation of an engine crankshaft, said ignition signals contributing to the ignition, and also generating paired voltage signals before and after and of the opposite polarity to each of said ignition signals, a fuel injection valve for supplying fuel into an intake manifold, and a microcomputer for controlling the "open" time of said fuel injection valve according to an engine operating condition, said system further comprising:

means for detecting the time interval between adjacent two of said voltage signals for every voltage signal generation;

judging means for comparing two latest successive time intervals which have been detected; and means for determining one of said paired voltage signals to be a specific signal for obtaining a fuel injection timing according to the result of judgment by said judging means.

2. The electronic fuel injection system according to claim 1, wherein if the latest one of said two latest successive time intervals is longer than the second latest one, the latest detected voltage signal is selected as said specific signal.

3. The electronic fuel injection system according to claim 1, wherein if the latest one of said two latest successive time intervals is shorter than the second latest one, the second latest detected voltage signal is selected as said specific signal.

4. The electronic fuel injection system according to claim 1, wherein said self-triggered ignition unit has a structure of dividing a voltage induced on the ignition coil primary winding according to the rotation of a rotor in synchronism to the engine with a voltage divider circuit, causing on-off operation of a control transistor according to the potential on a voltage division node, and turning off a main transistor connected in series with the ignition coil primary winding when said control transistor is turned on, thereby causing spark generation in an ignition plug to be connected to the ignition coil secondary winding.

5. The electronic fuel injection system according to claim 1, wherein said engine further comprises a recoil starter and power source means for supplying power for the driving and control of said fuel injection valve, which power is generated with the rotation of a fly wheel coupled to its crankshaft.

6. The electronic fuel injection system according to claim 5, which further comprises means for supplying fuel to said fuel injection valve, which fuel is pressurized by a mechanical pump driven in an interlocked relation to the rotation of said flywheel.

* * * * *